(12) United States Patent
Tsirkin et al.

(10) Patent No.: US 12,169,728 B2
(45) Date of Patent: Dec. 17, 2024

(54) NON FRAGMENTING MEMORY BALLOONING

(71) Applicant: Red Hat, Inc., Raleigh, NC (US)

(72) Inventors: Michael Tsirkin, Yokneam Illit (IL); David Hildenbrand, Grasbrunn (DE)

(73) Assignee: Red Hat, Inc., Raleigh, NC (US)

( * ) Notice: Subject to any disclaimer, the term of this patent is extended or adjusted under 35 U.S.C. 154(b) by 402 days.

(21) Appl. No.: 17/188,433

(22) Filed: Mar. 1, 2021

(65) Prior Publication Data

US 2022/0276889 A1 Sep. 1, 2022

(51) Int. Cl.
*G06F 9/455* (2018.01)
*G06F 9/50* (2006.01)
*G06F 9/54* (2006.01)

(52) U.S. Cl.
CPC ...... *G06F 9/45558* (2013.01); *G06F 9/45545* (2013.01); *G06F 9/5016* (2013.01); *G06F 9/542* (2013.01); *G06F 2009/45579* (2013.01); *G06F 2009/45583* (2013.01)

(58) Field of Classification Search
CPC ............. G06F 9/45558; G06F 9/45545; G06F 9/5016; G06F 9/542; G06F 2009/45579; G06F 2009/45583
See application file for complete search history.

(56) References Cited

U.S. PATENT DOCUMENTS

| | | | |
|---|---|---|---|
| 8,145,763 B2 | 3/2012 | Waldspurger | |
| 8,359,451 B2 | 1/2013 | Chen et al. | |
| 9,069,669 B2 | 6/2015 | Li et al. | |
| 9,280,458 B2 | 3/2016 | Durrant | |
| 9,529,611 B2 | 12/2016 | McDougall et al. | |
| 2002/0144073 A1* | 10/2002 | Trainin | G06F 12/023 711/170 |
| 2010/0241785 A1* | 9/2010 | Chen | G06F 12/08 718/1 |
| 2017/0068554 A1* | 3/2017 | Tsirkin | G06F 9/45558 |

(Continued)

OTHER PUBLICATIONS

Salomie, et al, "Application Level Ballooning for Efficient Server Consolidation", Apr. 15, 2013, Systems Group, Computer Science Department, ETH Zurich, Switzerland, UNSW and NICTA, Australia, https://people.inf.ethz.ch/troscoe/pubs/eurosys13-alb.pdf, 14 pages.

(Continued)

*Primary Examiner* — Qamrun Nahar
*Assistant Examiner* — Jonathan R Labud
(74) *Attorney, Agent, or Firm* — Womble Bond Dickinson (US) LLP

(57) ABSTRACT

Technology is disclosed for non-fragmenting memory ballooning. An example method may involve: receiving, by a processing device, a request associated with a memory balloon; searching for available memory chunks in a memory, wherein the memory is fragmented and comprises a set of available chunks that are separate from each other; selecting, by the processing device, a first chunk and a second chunk of the set of available chunks, wherein the first chunk is smaller than the second chunk and is selected before the second chunk; and associating the first chunk and the second chunk with the memory balloon.

19 Claims, 7 Drawing Sheets

(56) References Cited

U.S. PATENT DOCUMENTS

2019/0065087 A1* 2/2019 Li .................... G06F 3/0625

OTHER PUBLICATIONS

Chiang, et al., "Working Set-based Physical Memory Ballooning", 2013, Stony Brook University; Industrial Technology Research Institute, https://www.usenix.org/system/files/conference/icac13/icac13_chiang.pdf, 5 pages.

* cited by examiner

NON FRAGMENTING MEMORY BALLOONING

TECHNICAL FIELD

The present disclosure is generally related to virtualized computer systems, and more particularly, to memory allocation in virtualized computer systems.

BACKGROUND

Virtualization allows multiplexing of an underlying host machine between different virtual machines. The host machine allocates a certain amount of its resources to each of the virtual machines. Each virtual machine is then able to use the allocated resources to execute applications, including operating systems (referred to as guest operating systems). A software layer that provides the virtualization is commonly referred to as a hypervisor (also known as a virtual machine monitor (VMM)). The hypervisor emulates the underlying hardware of the host computer, making the use of the virtual machine transparent to the guest operating system and the user of the computer.

A host machine can accommodate more virtual machines than the size of its physical memory allows. Using virtual memory techniques, the host machine can give each virtual machine the impression that it has a contiguous address space, while in fact the memory used by the virtual machine may be fragmented and even overflow to disk storage. When the host machine needs to free up memory, it may select memory pages that have been assigned to virtual machines and page-out the contents of those memory pages to secondary storage. When the virtual machines attempt to access those memory pages, the host machine then page-in the contents of the memory page by reading the contents that have been stored in the secondary storage and writing those contents back to memory.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
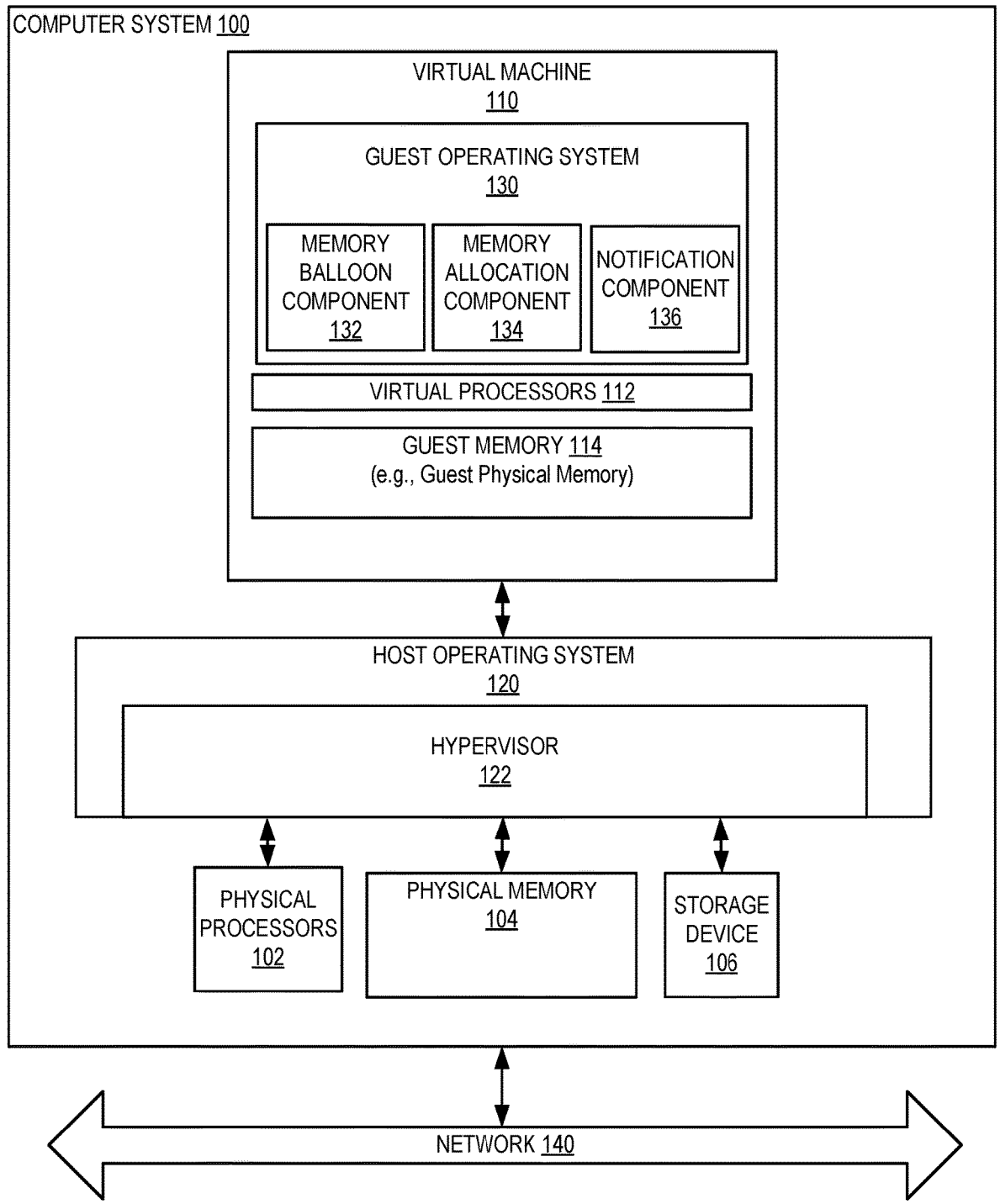
FIG. 1 depicts a high-level block diagram of an example computer system architecture, in accordance with one or more aspects of the present disclosure.

Many modern virtualized computer systems include overlapping memory management features that manage the same underlying physical memory resources. For example, a hypervisor and a guest operating system may both include memory management functionality that implements a caching mechanism across different storage devices. The caching mechanism may involve memory pages that are paged to or from a persistent storage. Paging into the persistent storage (e.g., paging out) refers to copying content of a memory page in a portion of physical memory to the persistent storage so that the portion of physical memory can be reused. Paging from the persistent storage (e.g., paging in) refers to copying content of a memory page from persistent storage back to physical memory. The hypervisor and guest operating systems may function separately when managing the same physical memory. The hypervisor may allocate memory to a virtual machine but may be unaware of which portions of the allocated memory are in use by a guest operating system executing on the virtual machine. Knowledge of the guest operating system's use of the memory may be beneficial to a hypervisor managing memory because portions of memory that have been freed by the guest operating system may be reused by the hypervisor without the overhead of copying the data in the memory to and from persistent storage (e.g., page swapping).

Virtualized computer systems have evolved to use memory ballooning to share information about the use of memory between the guest operating system and the hypervisor. Memory ballooning may involve the use of a memory balloon that is maintained by the guest operating system and is used to indicate to the hypervisor portions of memory that are not being used by the guest operating system and can be reused by the hypervisor. The guest operating system may inflate the memory balloon to reduce the amount of host memory in use by the virtual machine or may deflate the memory balloon to increase the amount of host memory in use by the virtual machine. The guest operating system may share memory use information in view of the memory balloon. For example, a guest operating system may share memory use information with the hypervisor that identifies particular chunks of guest memory that are associated with the memory balloon and are not being used by the guest operating system. The hypervisor may use the memory use information when determining a portion of memory to evict and may prefer to evict memory associated with the memory balloon since it may not be in use and its content can be overwritten without making a copy (e.g., paging the content in/out of secondary storage).

Memory may become fragmented during use and associating large contiguous amounts of memory with the memory balloon may increase the memory fragmentation. When the virtualized computer system is started it may be associated with large and contiguous areas of available memory. Over time and with use, the long contiguous areas of available memory may become fragmented into smaller and smaller contiguous areas of available memory. Eventually, it may become challenging for a program to obtain a large contiguous chunk of memory. Assigning large amounts of contiguous memory to the memory balloon may increase the fragmentation because it leaves less memory available to fulfill requests. When the other programs request memory resources, their requests may be fulfilled using non-contiguous memory that includes multiple separate chunks of memory and may degrade the performance of the program, the guest operating system, or the virtualized computer system.

Aspects of the present disclosure address the above and other deficiencies by providing technology that enables memory ballooning to reduce memory fragmentation. The technology may be implemented within an operating system and may apply to the memory allocation functions of the kernel, a balloon driver, other computer program, or a combination thereof. In one example, a processing device of a virtualized computer system (e.g., host machine) may receive a request corresponding to a memory balloon. The request may be initiated by a hypervisor or guest operating system and may cause a memory balloon to be created or the size of the memory balloon to be modified (e.g., inflated). The processing device may search for available memory chunks in memory. The memory may be fragmented and may include a set of available chunks. Searching for the available memory often involves searching for larger chunks initially and then through the smaller chunks when there are not enough large chunks available (e.g., search based on best fit, first fit, worst fit). The technology disclosed herein may initially search for smaller chunks of available memory and subsequently search for larger chunks when there are not enough smaller chunks to fulfill the request. The processing device may select a first and second chunk and the first chunk may be selected before the second chunk and may be smaller than the second chunk. In one example, processing device may select all of the smaller chunks (e.g., 4 KB chunks) before selecting a larger chunk (e.g., 2 MB chunk). The processing device may associate the selected chunks with the memory balloon and provide memory use information associated with the memory balloon to a kernel (e.g., hypervisor or host kernel) so it can be used to manage the physical memory of the host.

The systems and methods described herein include technology that enhances the memory management of virtualized computer systems. In particular, aspects of the present disclosure provide technology that enables a memory balloon to reduce the amount of memory fragmentation associated with a guest virtual machine. The reduction in the memory fragmentation may enhance the performance of the guest virtual machine by leaving larger chunks of contiguous memory available to be allocated to programs running on the guest virtual machine. The use of larger chunks of contiguous memory may also enhance the virtualized computer system as a whole because servicing the use of the memory in more contiguous chunks is more efficient for the hypervisor and/or host operating system.

Various aspects of the above referenced methods and systems are described in details herein below by way of examples, rather than by way of limitation. The examples provided below discuss a virtualized computer system with a hypervisor and host operating system, but other examples may include a hypervisor without an underlying host operating system (e.g., bare metal hypervisor).

FIG. 1 depicts an illustrative architecture of elements of a computer system 100, in accordance with an embodiment of the present disclosure. It should be noted that other architectures for computer system 100 are possible, and that the implementation of a computer system utilizing embodiments of the disclosure are not necessarily limited to the specific architecture depicted. In the example shown in FIG. 1, computer system 100 may include one or more virtual machines 110 and a host operating system 120.

Computer system 100 may be a single host machine or multiple host machines arranged in a cluster and may include a rackmount server, a workstation, a desktop computer, a notebook computer, a tablet computer, a mobile phone, a palm-sized computing device, a personal digital assistant (PDA), etc. In one example, computer system 100 may be a computing device implemented with x86 hardware. Computer system 100 may include host hardware, which may include one or more physical processors 102, physical memory 104 (e.g., primary storage, main memory), storage device 106 (e.g., secondary storage, Hard Disk Drive (HDD), Solid-State Drive (SSD)), and hardware components (e.g., I/O devices), or a combination thereof.

Physical processors 102 herein refer to devices capable of executing instructions encoding arithmetic, logical, or I/O operations. In one example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

Physical memory 104 and storage device 106 may include any data storage that is capable of storing digital data. Physical memory 104 may include volatile memory devices (e.g., random access memory (RAM)), non-volatile memory devices (e.g., flash memory, NVRAM), and/or other types of memory devices. Storage device 106 may include mass storage devices, such as magnetic or optical storage based disks, tapes, or hard drives. Storage device 106 may be internal to computer system 100 (as shown) or may be external to computer system 100, such as data storage that is accessed by computer system 100 via a direct connection or a network connection. Physical memory 104 may be managed by hypervisor 122, host operating system 120, or a combination thereof and may be referred to as host memory or hypervisor memory.

Hypervisor 122 may also be known as a virtual machine monitor (VMM). In the example shown, hypervisor 122 may be a component of a host operating system 120. In another example, hypervisor 122 may run on top of a host operating system 120, or may run directly on host hardware without the use of a host operating system 120. Hypervisor 122 may manage system resources, including access to physical processors 102, physical memory 104, storage device 106, and I/O devices. The hypervisor 122, though typically implemented in computer code, may emulate and export a bare machine interface to higher level programs in the form of virtual processors 112 and guest memory 114. Higher level programs may comprise a standard or real-time operating system (OS), may be a highly stripped down operating environment with limited operating system functionality, may not include traditional OS facilities, etc. Hypervisor 122 may present other programs (i.e., "guest" programs) the abstraction of one or more virtual machines (VMs) 110 that provide the same or different abstractions to various guest programs (e.g., guest operating system, guest applications).

Computer system 100 may host any number of virtual machines 110 (e.g., a single VM, one hundred VMs, etc.). Virtual machine 110 may execute guest programs that uses an underlying emulation of the physical resources (e.g., virtual processors 112 and guest memory 114). The guest programs may include a guest operating system 130, guest applications, guest device drivers, etc. Virtual machine 110 can be, for example, hardware emulation, full virtualization, para-virtualization, and operating system-level virtualization virtual machines. The virtual machine 110 may have the same or different types of guest operating systems 130, such as Microsoft®, Windows®, Linux®, Solaris®, etc.

Guest memory 114 may be any virtual memory, logical memory, physical memory, other portion of memory, or a combination thereof for storing, organizing, or accessing data. Guest memory 114 may represent the portion of memory that is designated by hypervisor 122 for use by a virtual machine 110 and may be managed by guest operating system 130.

Guest operating system 130 may include a memory balloon component 132, a memory allocation component 134, and a notification component 136. Memory balloon component 132 may enable guest operating system 130 to manage a memory balloon. The memory balloon may be inflated by adding memory to the memory balloon and may be deflated by removing memory from the memory balloon. Memory may be added to the memory balloon by using memory allocation component 134. Memory allocation component 134 may search for available chunks of memory and may select chunks that when allocated will reduce the overall fragmentation of the memory. Notification component 136 may enable the guest operating system 130 manage notifications for memory chunks. Notification component 136 may enable a program (e.g., balloon driver) to register for notifications associated with a particular chunk of unavailable memory. When the chunk becomes available the program may be notified so that the chunk can be incorporated into the memory balloon to further reduce memory fragmentation. Components 132, 134, and 136 may be executed by a guest operating system, a kernel, a driver, other program or code, or a combination thereof. For example, the features of memory allocation component 132 may be implemented by the kernel and the features of memory balloon component 134 and notification component 136 may be implemented in a driver (e.g., balloon driver). The features of memory balloon component 132, memory allocation component 134, and notification component 136 are discussed in more detail below in regards to components 332, 334, and 336 of FIG. 3.

Network 140 may be a public network (e.g., the internet), a private network (e.g., a local area network (LAN) or wide area network (WAN)), or a combination thereof. In one example, network 140 may include a wired or a wireless infrastructure, which may be provided by one or more wireless communications systems, such as a wireless fidelity (WiFi) hotspot connected with the network 140 and/or a wireless carrier system that can be implemented using various data processing equipment, communication towers, etc.

Figure 2:
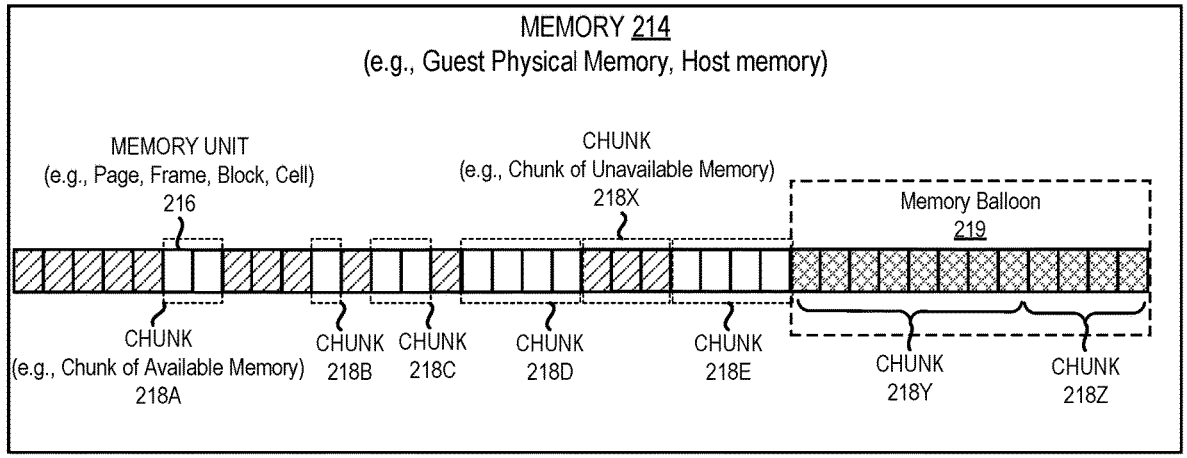
FIG. 2 depicts a high-level block diagram of an example of a memory that is fragmented and a memory data structure representing a set of available memory chunks, in accordance with one or more aspects of the present disclosure.
Figure 2:
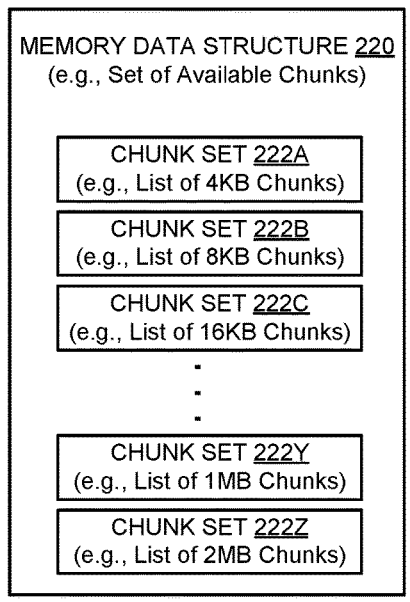

FIG. 2 depicts a block diagram illustrating memory 214 and a memory data structure 220, in accordance with one or more aspects of the present disclosure. In the example illustrated, memory 214 may be the same or similar to guest memory, hypervisor memory, host memory, computing device memory, other memory, or a combination thereof. Memory 214 may include one or more memory units 216, chunks 218A-Z, and memory balloon 219.

Memory 214 may be managed by an operating system and may be organized into multiple memory units. A memory unit 216 may be a contiguous or non-contiguous sequence of bytes or bits and may be the same or similar to one or more pages, frames, blocks, cells, other unit, or a combination thereof. Memory unit 216 may have a storage size that is based on (e.g., multiple of) an access unit of the underlying memory device. The size of memory units may be a fixed-size (e.g., a particular integer value) and may be the size of a standard memory page (e.g., 4 KB), an enlarged memory page (e.g., 2 MB, referred to as "huge pages"), or other size. In one example, memory 214 may be guest physical memory and the memory unit 216 may be a guest memory page managed by a guest operating system.

Each of the chunks 218A-Z may be a contiguous or non-contiguous portion of memory that includes one or more memory units (e.g., blocks, pages). The size of a chunk may depend on the number of memory units it includes. Chunks 218A-Z may have chunks with the same size, different sizes, or a combination thereof. A chunk may be contiguous when it includes a continuous portion or range of a memory address space. The memory address space may be a virtual memory address space (e.g., guest virtual memory, hypervisor virtual memory), a logical memory address space (e.g., guest physical memory), a physical memory address space (e.g., hypervisor physical memory, host memory), or a combination thereof. The chunk may be contiguous within a first memory address space (e.g., contiguous guest physical memory) with or without being contiguous in another memory address space (e.g., backed by non-contiguous host physical memory).

Each chunk may include available memory, unavailable memory, or a combination thereof. The availability or unavailability of memory may depend on whether or not the portion of memory has been allocated. Allocating memory may involve searching, selecting, assigning, protecting, and/or reserving memory for use by an executable entity (e.g., process, thread, virtual machine, hypervisor, host, etc.). A chunk may be an available chunk of memory when some or all of the memory of the chunk is available (e.g., unallocated, free, unassigned, unregistered, unused, not in use), as illustrated by Chunks 218A-E. A chunk may be an unavailable chunk of memory when some or all of the memory of the chunk is unavailable (e.g., allocated, in use, assigned, reserved), as illustrated by Chunks 218X-Z.

Chunks 218A-E may be available chunks that are separate from one another. The available chunks may be separate when each chunk in the set is separate from each other chunk in the set by at least one unavailable chunk or a memory boundary (e.g., boundary of address space, heap, stack, or memory device). An available chunk may be separate when it is absent an adjacent chunk that is available and has one or more adjacent unavailable chunks. For example, an available chunk may be considered separate when it is surrounded by unavailable chunks that are or are not actively in use (e.g., allocated to process but not in use by process). Chunks that are separate may be the same or similar to individual chunks, discreet chunks, independent chunks, non-adjacent chunks, or other term. An available chunk that has one or more adjacent available chunks may not be considered separate, but may be merged (e.g., coalesced) into a larger chunk of available memory. The larger chunk (e.g., coalesced chunk) may be surrounded by unavailable chunks and considered separate. Merging is discussed in more detail below in regards to FIG. 3.

Memory 214 may be considered fragmented because it includes available chunks that are separate from each other. The fragmentation of memory may include different forms of fragmentation that include external fragmentation, internal fragmentation, and data fragmentation. External fragmentation (e.g., externally fragmented memory) may involve having gaps or fragments of available memory between portions of unavailable memory. Internal fragmentation (e.g., internally fragmented memory) may involve having gaps internal to a portion of unavailable memory. This may occur when a size being requested is not a multiple of the memory unit size and is therefore not evenly divisible by the memory unit size (e.g., requesting 7 KB when each memory unit is 4 KB). This results in a portion of an allocated memory unit being unused (e.g., 1 KB is unused of the second 4 KB memory unit). Data fragmentation may occur when an allocation request is fulfilled using multiple separate chunks of available memory (e.g., fulfilled using the gaps or fragments of available memory) and may occur when memory is already externally fragmented memory. This and other forms of fragmentation may be reduced or eliminated using memory balloon 219 and the non-fragmenting memory ballooning technology disclosed herein.

Memory balloon 219 may be a data structure that is associated with a portion of memory that is allocated but remains unused. Memory is typically allocated for use by a process and is then used by the process to store data. The portion of memory associated with a memory balloon (e.g., chunks 218Y-Z) may be allocated to a balloon driver but may remain unused. This may be advantageous for systems that use memory over commitment and have chunks of physical memory that back the chunks associated with the memory balloon. Since the chunks associated with the memory balloon remain unused, the physical memory backing chunks 218Y-Z can be reused without the overhead of copying the stored content (e.g., avoids paging and swapping). The size of memory balloon 219 may increase (e.g., inflate) or decrease (e.g., deflate) over time, which is discussed in more detail in regards to FIG. 3.

Memory data structure 220 may be a data structure that provides an organized representation of the chunks of memory 214. The organized representation may be the same or similar to an index or table of contents and may indicate the locations of chunks and organize the chunks based on one or more attributes. The attributes may include or be based on availability (e.g., allocated, unallocated), size (e.g., 4 KB, 8 KB, 16 KB chunk), location (e.g., memory address), time (e.g., read time, write time), entity (e.g., identifier of process, OS, VM, Hypervisor, Host), other attribute, or a combination thereof. Memory data structure 220 may be updated before, during, or after memory is allocated or deallocated and may represent a current state of memory 214 (e.g., status of chunks, units, pages, frames, blocks, or cells status).

Memory data structure 220 may organize the chunks based on the attributes using one or more sets. In one example, memory data structure may be a set of sets (e.g., array of lists or a tree) that is organized in a hierarchy with one or more layers (e.g., levels, tiers). A first layer may include a first set of elements (e.g., array, links of root node) and each element may be associated with (e.g., link to) an element of a second layer (e.g., lists, intermediate nodes). Each element of the second layer may correspond to a different set (e.g., chunk set). As shown in FIG. 2, memory data structure 220 may organize the chunks into multiple chunk sets 222A-Z.

Each of the chunk sets 222A-Z may correspond to a set of memory chunks in memory 214. Chunk sets 222A-Z may be implemented using one or more lists (e.g., linked list, doubly linked list), arrays, queues, bins, containers, trees, indices, tables, matrices, other data structure, or a combination thereof. Each set may be a non-empty set that includes one or more chunks or may be an empty set that does not include any chunks (e.g., absent, missing, or without chunks). Each chunk set may be updated to add or remove a chunk by adding or removing a reference of a chunk to the chunk set. The reference may uniquely identify a chunk and may include identification data (e.g., identifier, address, pointer, offset, location, or other value). Each set may correspond to one or more particular attributes (e.g., availability, size), particular values of an attribute (e.g., 2 MB), or a combination thereof.

As shown in FIG. 2, memory data structure 220 may include a first level set (e.g., set of sets) that includes all the chunks that share a value of an availability attribute (e.g., availability=unallocated). The sets at a second level (e.g., chunk sets 222A-Z) may all correspond to variations of a size attribute. Each set (chunk sets 222A-Z) of the second level may correspond to a particular value or range of values of the size attribute. In the example shown, chunk sets 222A-Z may each correspond to a particular value (e.g., chunk set 222A=4 KB size and chunk set 222Z=2 MB size). In other examples, each of the chunk sets may correspond to a range of values and a first chunk set may correspond to values that are smaller than a threshold value (e.g., smaller chunks that are below 128 KB) and a second chunk set may correspond to values that are equal to or larger than a threshold value (e.g., larger chunks that are equal to or above 128 KB).

Figure 3:
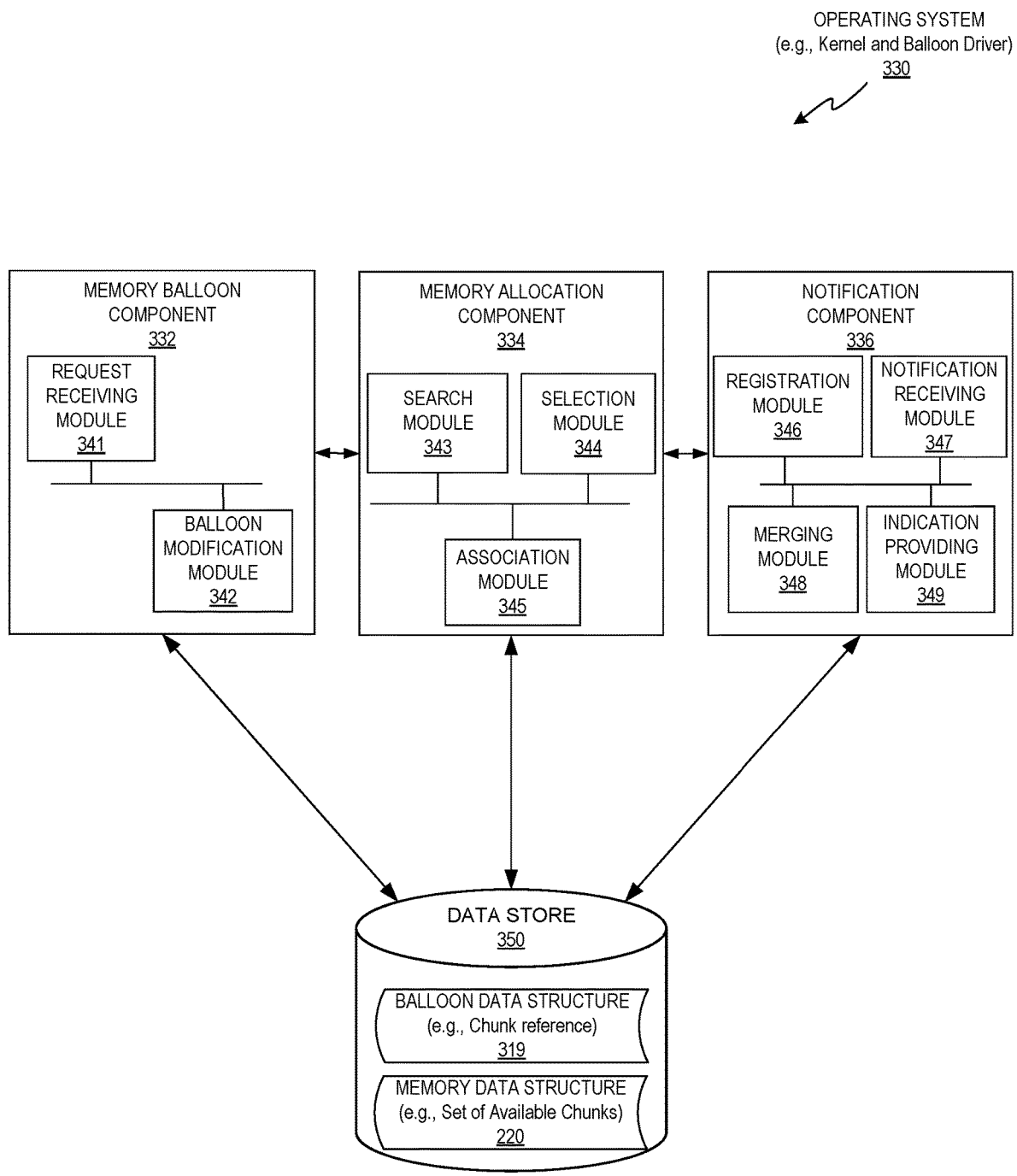
FIG. 3 depicts a block diagram of an example operating system that implements non fragmenting memory ballooning in accordance with one or more aspects of the present disclosure.

FIG. 3 depicts a block diagram illustrating an exemplary operating system 330 that includes technology for implementing a non fragmenting memory ballooning, in accordance with one or more aspects of the present disclosure. Operating system 330 may be the same or similar to the guest operating system 130 or host operating system 120 of FIG. 1 and may include memory balloon component 332, memory allocation component 334, notification component 336, and a data store 350. The features discussed in regards to components and modules of FIG. 3 may be performed by any portion of operating system 330. For example, one or more of the components or modules discussed below may be performed by a kernel, a driver, an application, other portion of operating system 330, or a combination thereof. More or less components or modules may be included without loss of generality. For example, two or more of the components may be combined into a single component, or features of a component may be divided into two or more components. In one implementation, one or more of the components may reside on different devices (e.g., a computer and a solid-state drive).

Memory balloon component 332 may enable operating system 330 to manage a memory balloon. Managing the memory balloon may involve creating, removing, and maintaining the memory balloon. In one example, memory balloon component 332 may include a request receiving module 341 and a balloon modification module 342.

Request receiving module 341 may enable guest operating system 130 to receive requests associated with a memory balloon. The requests may be received from a sending entity (i.e., sender), which may be the hypervisor, the guest operating system 130, a different guest operating system, or a combination thereof. The requests may be received by a receiving entity (i.e., recipient) that may be the kernel, the balloon driver, other portion of operating system 330, or a combination thereof. In one example, the balloon driver may receive the request from the kernel of the guest operating system 130 in response to (e.g., if, when, after) the kernel detecting there is a shortage or abundance of guest memory (e.g., guest physical memory or guest virtual memory). In another example, the balloon driver may receive the request from the hypervisor in response to (e.g., if, when, after) the hypervisor detecting there is a shortage or abundance of hypervisor memory (e.g., host physical memory or hypervisor virtual memory). In either example, detecting the memory shortage or abundance may be based on the presence, absence, or quantity of storage operations (e.g., quantity satisfying a predetermined threshold). The storage operations may include or be based on paging (e.g., page faults), swapping, context switches, writes, reads, accesses, other primary or secondary storage operation, or a combination thereof.

Each request may be received in the form of one or more shared memory updates, message transmissions, other signal or interprocess communication, or a combination thereof. In one example, the requests may be received by having the sender update a portion of storage that is accessible to both the sender and the receiver (e.g., shared memory, file, object, register). The portion of storage may be modified by the sender, the receiver, or a combination thereof. The sender may store the request in a shared storage structure (e.g., write the request to queue, buffer, list, array) and the receiver may receive the request by accessing the shared storage structure (e.g., read the request). In another example, the requests may be received via the transmission of one or more messages (e.g., function calls, interrupts, faults, exceptions, errors). Each message may include the content of the request or may indicate that a new request exists without including the content of the request.

The content of the request may include data that is associated with the memory balloon. The data may indicate or identify the memory balloon, guest operating system, virtual machine, hypervisor, host, memory, other entity or a combination thereof. The content may also or alternatively indicate whether a size of the memory balloon should change (e.g., increase or decrease) and may include a size value. The size value may correspond to a size of the memory balloon (e.g., past, current, or future total size) or the size of a change to the memory balloon (e.g., increment size, decrement size). In one example, the request may indicate a particular amount of memory to add to the memory balloon (e.g., 1 GB).

Balloon modification module 342 may enable the operating system to modify one or more memory balloons. Modifying a memory balloon may involve creating, deleting, replacing, or moving a memory balloon. A memory balloon may be modified by adding memory to the memory balloon (e.g., inflating, increasing), removing memory from the memory balloon (e.g., deflating, decreasing), or replacing memory of the memory balloon (e.g., reconfiguring). Adding and removing memory from the memory balloon may result in a memory balloon with a different size (e.g., size change) and are discussed in regards to memory allocation component 334. Replacing memory may change the memory balloon without changing the resulting size of the memory, which is discussed in more detail in regards to merging module 348.

Memory allocation component 334 may enable the guest operating system to allocate memory that is associated with the memory balloon. In the example shown in FIG. 3, memory allocation component 334 may include a search module 343, a selection module 344, and an association module 345. Features of memory allocation component 334 may be implemented by a kernel, driver, other portion of an operating system, or a combination thereof. In one example, the features of search module 343 and selection module 344 may be implemented by a kernel of a guest operating system (e.g., kernel memory management module). In another example, the features of search module 343 and selection module 344 may be implemented by a driver of the guest operating system (e.g., balloon driver).

Search module 343 may enable the operating system to search for chunks of available memory. Search module 343 may search for available memory chunks in memory by analyzing one or more data structures, by inspecting particular portions of memory, by scanning some or all of the memory, or a combination thereof. Many memory allocation algorithms fulfill requests by searching for larger available memory chunks before searching for smaller available memory chunks. Search module 343 may do the opposite and may implement a search order that searches for smaller chunks of available memory before searching for larger chunks of available memory. Having a smaller-to-larger search order may be advantageous because the smaller chunks may contribute more to the fragmentation of memory and by allocating the smaller chunks before the larger chunks, it may avoid increasing the fragmentation. In one example, memory allocation component 334 will reduce (e.g., diminish, shrink, lessen the memory fragmentation) and may even eliminate the memory fragmentation by removing all of the gaps of available memory between the unavailable memory.

Search module 343 may search for available memory chunks using one or more memory data structures (e.g., memory data structure 220). Search module 343 may access the data structure that represents the set of available chunks from primary storage (e.g., main memory) or secondary storage (e.g., hard disk drive or solid-state drive). As discussed above, a memory data structure may include multiple sets that correspond to different sizes of available chunks (e.g., chunk sets 222A-Z). For example, a first set (e.g., chunk set 222A) may include available chunks that are smaller than available chunks of a second set (e.g., chunk set 222B or 222Z). Search module 343 may analyze the sets based on the chunk sizes associated with the set in an increasing size order. In one example, search module 343 may skip empty sets and begin by searching the non-empty set with the smallest size and proceed to sets with larger sizes.

Selection module 344 may select one or more chunks from the set of available chunks. The order in which the chunks are selected may be based on the search order discussed above (e.g., smallest to largest). Selection module 344 may select multiple chunks of available memory and may select one or more smaller chunks (e.g., 4 KB chunks) before selecting a larger chunk (e.g., 2 MB chunk). Selection module 344 may select a large number of chunks in order to satisfy a requested size. The number of chunks may depend on the size of the available chunks and the size being requested. By searching and selecting the smaller chunks and avoiding the largest chunks the selection module may reduce or eliminate fragmentation of the memory.

Association module 345 may enable the operating system to associate the selected chunks (e.g., recently allocated chunks) with the memory balloon. This may involve updating a balloon data structure 319 of the memory balloon in view of the selected chunks. The updating may involve replacing, removing, or adding references of the selected chunks to the memory data structure. This may be advantageous because chunks that are associated with the memory balloon may remain unused and the operating system may notify other portions of a host machine so that the physical memory backing the unused chunks can be reused without storing a copy of the content.

Notification component 336 may enable the operating system to set up and process notifications that correspond to particular portions of memory. The notifications may be triggered based on the availability or unavailability of the particular portions of memory. In one example, notification component 336 may include a registration module 346, a notification receiving module 347, a merging module 348, and an indication providing module 349.

Registration module 346 may enable a process (e.g., balloon driver or kernel module) to register for notifications that are based on the availability of particular portions of memory. The particular portions of memory may not be associated with the process (e.g., not allocated or accessible to the process) and may be associated with another process or portion of the operating system. Traditionally, a process is restricted to receiving notifications on memory that is accessible to the process (e.g., allocated memory or accessible shared memory). The technology disclosed herein may enable the process to register for notifications on portions of a memory address space (e.g., guest physical memory) that are not associated with the process. The process may register based on a particular event type (e.g., deallocation event or free operation), a particular memory location (e.g., address of an adjacent chunk), other attribute, or a combination thereof. As discussed above, the available chunks associated with the memory balloon may be surrounded by unavailable chunks. Registration module 346 may enable the process to register for notification on the surrounding unavailable chunks. The process may register by providing identification data (e.g., memory address) of the available chunk, the unavailable chunk, or a combination thereof.

Notification receiving module 347 may enable the operating system to receive and process notifications. The notifications may be triggered based on an event related to a particular portion of memory. The event may be related to a change of the availability of the chunk (e.g., unavailable to available) and may be triggered before, during, or after, a deallocation. Notification receiving module 347 may include logic to determine whether a particular chunk is now available to be allocated. In one example, the notification may correspond to a free operation and the logic may check to see if the memory associated with the free operation corresponds to one of the surrounding unavailable chunks. In another example, the notification may correspond to a particular unavailable chunk and the logic may check to see if the memory is now available. In either example, notification receiving module 347 may determine that a surrounding chunk has become available and may make them accessible to merging module 348.

Merging module 348 may enable the operating system to merge the new chunks that have recently become available. Merging a new chunk may involve merging the new chunk with an adjacent chunk, merging the new chunk with the memory balloon, or a combination thereof. Merging the new chunk may involve associating a new chunk with the memory balloon with or without removing an existing chunk from the memory balloon. Merging may involve one or more replacements (e.g., replacement operations) that replace one or more existing chunks with the one or more new chunks (e.g., replace an existing larger chunk with multiple new smaller chunks). The replacement may result in a memory balloon that is the same size as before the replacement. The memory balloon may remain constant or may temporarily increase or decrease before, during, or after the initiation or completion of the merging (e.g., initiation of replacement operation). In one example, merging module 348 may involve coalescing memory chunks.

Coalescing may involve merging adjacent chunks of available memory into a larger chunk of memory (e.g., a single contiguous chunk). The larger chunk may be identified and managed more efficiently than multiple smaller chunks. Without coalescing, available chunks of memory may stay separate from each other in their original requested size, even if they are adjacent to each other. When a subsequent request for memory specifies a size of memory that cannot be met with an integer number of these (potentially unequally-sized) available chunks, the adjacent chunks of available memory cannot be allocated for this request. Coalescing alleviates this issue by setting the adjacent chunks of available memory to be contiguous without boundaries, such that part or all of it can be allocated and associated with memory balloon, as discussed above in regards to association module 345. Coalescing may be done as soon as chunks are available or may be deferred until a time later (e.g., deferred coalescing).

In one example, the operating system (e.g., balloon driver and kernel) may merge a chunk of the memory balloon with an adjacent chunk to produce a coalesced chunk. The operating system may then associate the coalesced chunk with the memory balloon and disassociate a chunk that has a size equal to a size of the adjacent chunk from the memory balloon so that the size of the memory balloon remains the same. In other examples, more or less adjacent chunks, balloon chunks, coalesced chunks, or other chunks may be processed sequentially or in parallel to update the memory balloon.

Indication providing module 349 may enable operating system 330 to notify a hypervisor or host OS that one or more chunks of memory are now associated with the memory balloon. Indication providing module 349 may notify the hypervisor that the memory balloon has been updated and that one or more chunks are no longer in use by a guest operating system. Indication providing module 349 may perform the notification using one or more indications.

Indications may include one or more signals for indicating to a hypervisor that one or more memory chunks of the hypervisor are not in use by the guest operating systems. The signal may be a message, interrupt, notification, exception, trap, other signal, or a combination thereof. The indications may be transmitted from a virtual machine to the hypervisor, from the hypervisor to the virtual machine, or a combination thereof. The indications may occur before, during, or after a memory chunk is associated with the memory balloon. The technology disclosed herein may implement different types of indications.

A first type of indication may be a message transmitted from a virtual machine to a hypervisor that includes identification data (e.g., identifier) of a chunk of guest memory or hypervisor memory (e.g., guest pages or hypervisor pages). The first type of indication may be one of a series of indications and each indication in the series may identify an individual memory chunk or an individual range of memory. In one example, each first type of indication may correspond to a system call, hypercall, other function call, or a combination thereof that is initiated by the guest operating system.

A second type of indication may be a batched message that is similar to the first type of indication and may include multiple memory chunks. Batching the memory chunks into the second type of indication (e.g., batched message) may be advantageous because it may reduce the communications overhead (e.g., I/O) that occurs between the virtual machines and the hypervisor. The second type of indication may be transmitted from the virtual machine to the hypervisor in response to a quantity of new memory associated with the memory page satisfying (e.g., at, above, or below) one or more threshold quantities. The threshold quantities may be based on a size of the guest or hypervisor memory page and may be a particular quantity of memory pages (e.g., page count) or a quantity of space occupied by the memory pages (e.g., buffer space limit). The threshold quantities may include one or more values that may include integers, percentages, ratios, other values, or a combination thereof. The values may be relative to the size or limit of a guest memory page, hypervisor memory page, physical storage devices, heap, page, buffer, other data structure, or a combination thereof.

A third type of indication may include one or more signals that identify a shared data structure that represents the status of guest or hypervisor chunks (e.g., memory pages). The shared data structure may indicate to the hypervisor which memory pages are associated with the memory balloon. A second type of indication may include a first signal that may be sent prior to a chunk of memory being associated with the memory page and one or more second signals may be sent after the chunk is associated with the memory page. The first signal may be in the form of a message that is transmitted during an initialization of guest operating system or initialization of a particular driver of guest operating system (e.g., balloon driver). The first signal may include information (e.g., reference, pointer) identifying the shared data structure. When the one or more memory chunks are associated with the memory balloon, the respective virtual machine may update the shared data structure to indicate to the hypervisor that the corresponding hypervisor memory page is unused by the guest operating system. The hypervisor may subsequently access the shared data structure after memory chunks are associated with the memory balloon. In one example, the hypervisor may listen for second signals (e.g., modification events) that indicate the shared data structure was updated. In another example, the hypervisor may not listen for second signals and may access the shared data structure when the hypervisor determines memory pages should be reallocated (e.g., memory page faults exceed a threshold or available memory pages fall below a threshold).

The shared data structure may be modified by one or more of the virtual machines and may be accessible to the hypervisor. The shared data structure may be an array (e.g., bitmap), a linked list, other data structure, or a combination thereof. The shared data structure may include an element (e.g., bit, node) for each of the memory units (e.g., memory pages) and the element may indicate whether the memory unit is associated or not associated with the memory balloon. In one example, the shared data structure may be stored in memory page space of the virtual machine. For example, each virtual machine may include a shared data structure in its respective guest memory, which may be accessible to the hypervisor. In another example, the shared data structure may be stored in hypervisor memory and be accessible to one or more of the virtual machines. In the latter example, there may be a separate shared data structure within hypervisor memory that corresponds to each of the virtual machine or there may be a single shared data structure accessible to the group of virtual machines.

Figure 4:
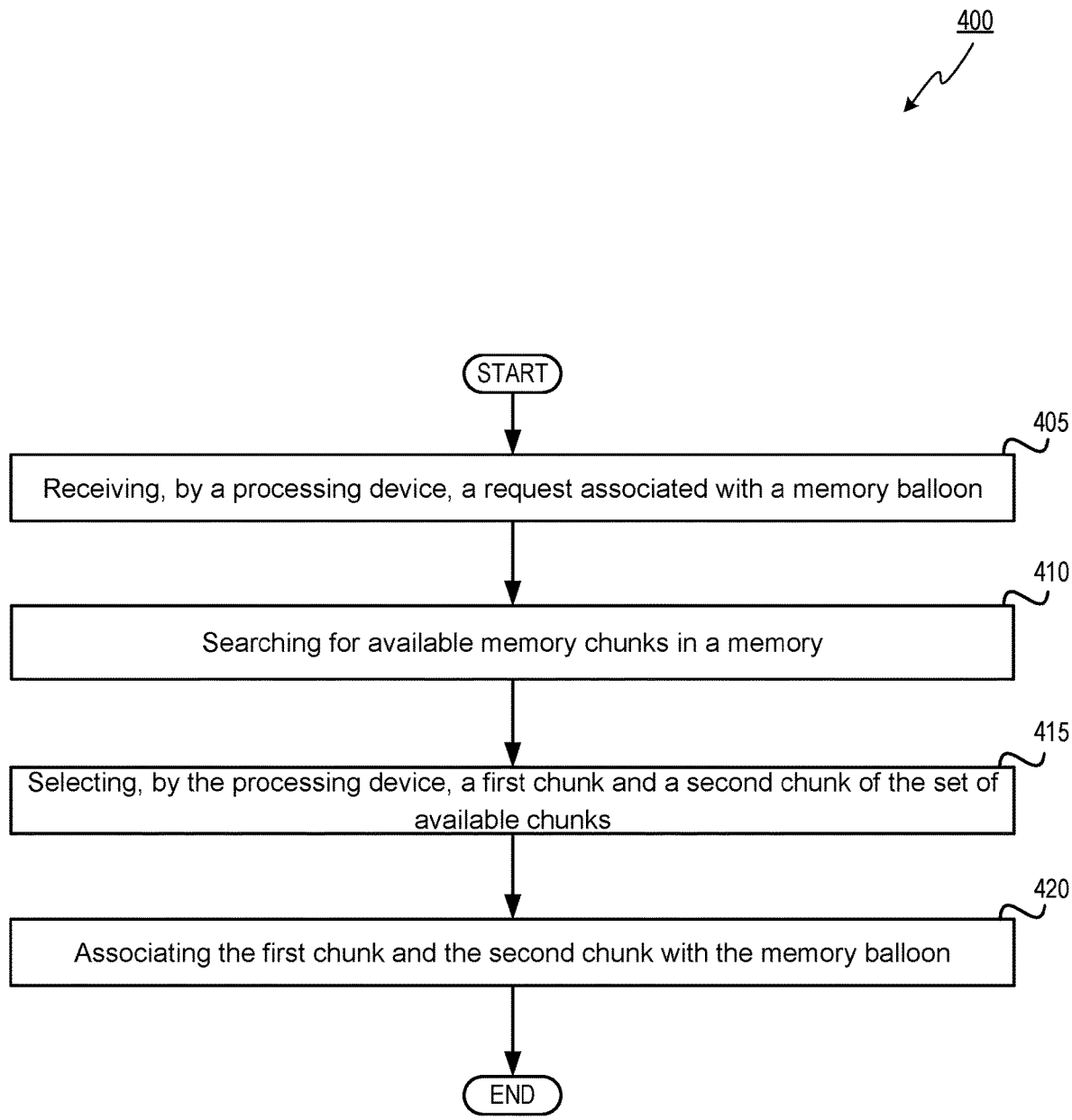
FIG. 4 depicts a flow diagram of an example method for non fragmenting memory ballooning, in accordance with one or more aspects of the present disclosure.

FIG. 4 depicts a flow diagram of one illustrative example of a method 400 for non fragmenting memory ballooning, in accordance with one or more aspects of the present disclosure. Method 400 and each of its individual functions, routines, subroutines, or operations may be performed by one or more processors of the computer device executing the method. In certain implementations, method 400 may be performed by a single processing thread. Alternatively, methods 400 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by guest operating system 130 or operating system 330 of FIGS. 1 and 2 respectively.

Method 400 may be performed by processing devices of a server device or a client device and may begin at block 405. At block 405, a processing device may receive a request associated with a memory balloon. In one example, receiving the request associated with the memory balloon may involve a guest operating system receiving a request to enlarge the memory balloon from a hypervisor. The guest operating system may include a balloon driver that manages the memory balloon in guest physical memory or guest virtual memory. The request may indicate a size of memory to add to the memory balloon. The size may be satisfied by adding one or more chunks of available memory to the memory balloon.

At block 410, the processing device may search for available memory chunks in the memory. The memory may be fragmented and include a set of available chunks that are separate from each other. The available chunks may be gaps or fragments of available memory within a memory that is mostly unavailable (e.g., allocated and in use). The search for available memory chunks may involve searching for a smallest chunk of available memory before searching for a larger chunk. In one example, the set of available chunks may include chunks of available guest physical memory that are backed by host physical memory.

Searching for available memory chunks may involve analyzing a data structure that represents the set of available chunks. The processing device may access the data structure and the data structure may include a first and second set (e.g., chunk sets). The first set may include available chunks that are smaller than available chunks of the second set and the search may involve searching the first set before the second set. In one example, the first set may be a list that identifies the available chunks that all have a first size (e.g., 4 KB) and the second set may be a list that identifies the available chunks that all have a second size (e.g., 2 MB).

At block 415, the processing device may select a first chunk and a second chunk of the set of available chunks. The first chunk may be smaller than the second chunk and may be selected before the second chunk. The first and second chunks as well as the other chunks in the set of available chunks may each be a contiguous portion of available memory that is surrounded by memory that is in unavailable and in use. The selecting may identify chunks that when allocated will reduce the amount the memory is fragmented. In one example, the searching and the selecting are performed by a kernel of a guest operating system (e.g., enhanced version of a kernel memory allocator). In another example, the searching and the selecting are performed by a balloon driver of the guest operating system (e.g., balloon driver makes calls to a traditional kernel memory allocator).

At block 420, the processing device may associate the first chunk and the second chunk with the memory balloon. In one example, the processing device may also associate a chunk that is adjacent to the first or second chunks. The processing device may associate the chunks with the memory balloon by merging the first chunk and the adjacent chunk to produce a coalesced chunk. The coalesced chunk may be associated with the memory balloon and a chunk of the memory balloon that has a size equal to the size of the adjacent chunk may be disassociated from the memory balloon. Responsive to completing the operations described herein above with references to block 420, the method may terminate.

In other examples of method 400, the processing device may register for notifications corresponding to unavailable memory that is adjacent to memory associated with the memory balloon. The processing device may receive a notification indicating a chunk that is adjacent to the first chunk of the memory balloon has become available. The adjacent chunk may replace a chunk of the memory balloon and the size of the memory balloon may remain constant (e.g., same size as before the replacement).

Figure 5:
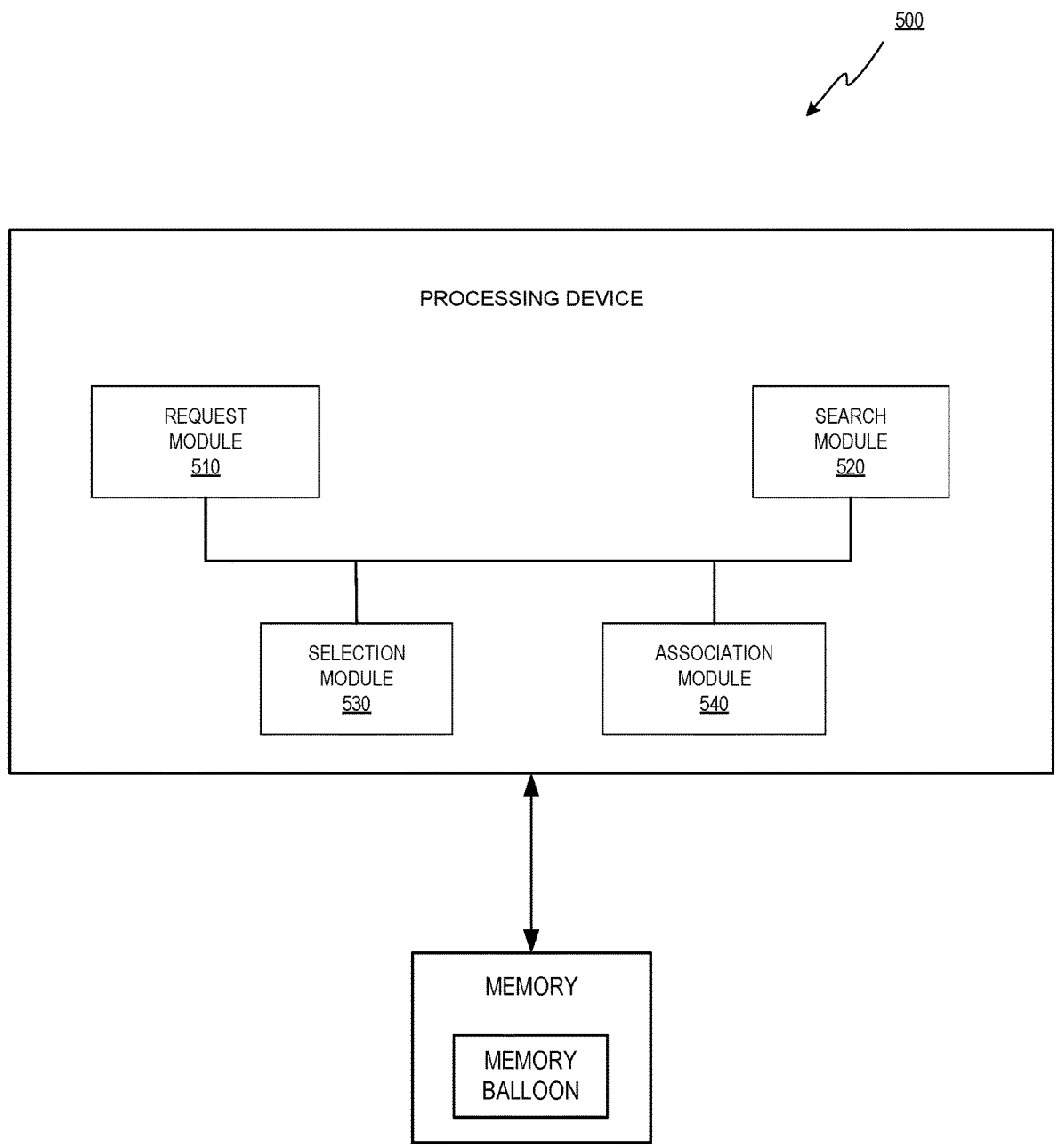
FIG. 5 depicts a block diagram of an example system in accordance with one or more aspects of the present disclosure.

FIG. 5 depicts a block diagram of a computer system 500 operating in accordance with one or more aspects of the present disclosure. Computer system 500 may be the same or similar to computer system 100 and may include one or more processing devices and one or more memory devices. In the example shown, computer system 500 may include memory request module 510, search module 520, selection module 530, and association module 540.

Memory request module 510 may enable a processing device to receive a request associated with a memory balloon. In one example, receiving the request associated with the memory balloon may involve a guest operating system receiving a request to enlarge the memory balloon from a hypervisor. The guest operating system may include a balloon driver that manages the memory balloon in guest physical memory or guest virtual memory. The request may indicate a size of memory to add to the memory balloon. The size may be satisfied by adding one or more chunks of available memory to the memory balloon.

Search module 520 may enable the processing device to search for available memory chunks in the memory. The memory may be fragmented and include a set of available chunks that are separate from each other. The available chunks may be gaps or fragments of available memory within a memory that is mostly unavailable (e.g., allocated and in use). The search for available memory chunks may involve searching for a smallest chunk of available memory before searching for a larger chunk. In one example, the set of available chunks may include chunks of available guest physical memory that are backed by host physical memory.

Searching for available memory chunks may involve analyzing a data structure that represents the set of available chunks. The processing device may access the data structure and the data structure may include a first and second set (e.g., chunk sets). The first set may include available chunks that are smaller than available chunks of the second set and the search may involve searching the first set before the second set. In one example, the first set may be a list that identifies the available chunks that all have a first size (e.g., 4 KB) and the second set may be a list that identifies the available chunks that all have a second size (e.g., 2 MB).

Selection module 530 may enable the processing device to select a first chunk and a second chunk of the set of available chunks. The first chunk may be smaller than the second chunk and may be selected before the second chunk. The first and second chunks as well as the other chunks in the set of available chunks may each be a contiguous portion of available memory that is surrounded by memory that is in unavailable and in use. The selecting may identify chunks that when allocated will reduce the amount the memory is fragmented. In one example, the searching and the selecting are performed by a kernel of a guest operating system (e.g., enhanced version of a kernel memory allocator). In another example, the searching and the selecting are performed by a balloon driver of the guest operating system (e.g., balloon driver makes calls to a traditional kernel memory allocator).

Association module 540 may enable the processing device to associate the first chunk and the second chunk with the memory balloon. In one example, the processing device may also associate a chunk that is adjacent to the first or second chunks. The processing device may associate the chunks with the memory balloon by merging the first chunk and the adjacent chunk to produce a coalesced chunk. The coalesced chunk may be associated with the memory balloon and a chunk of the memory balloon that has a size equal to the size of the adjacent chunk may be disassociated from the memory balloon.

Figure 6:
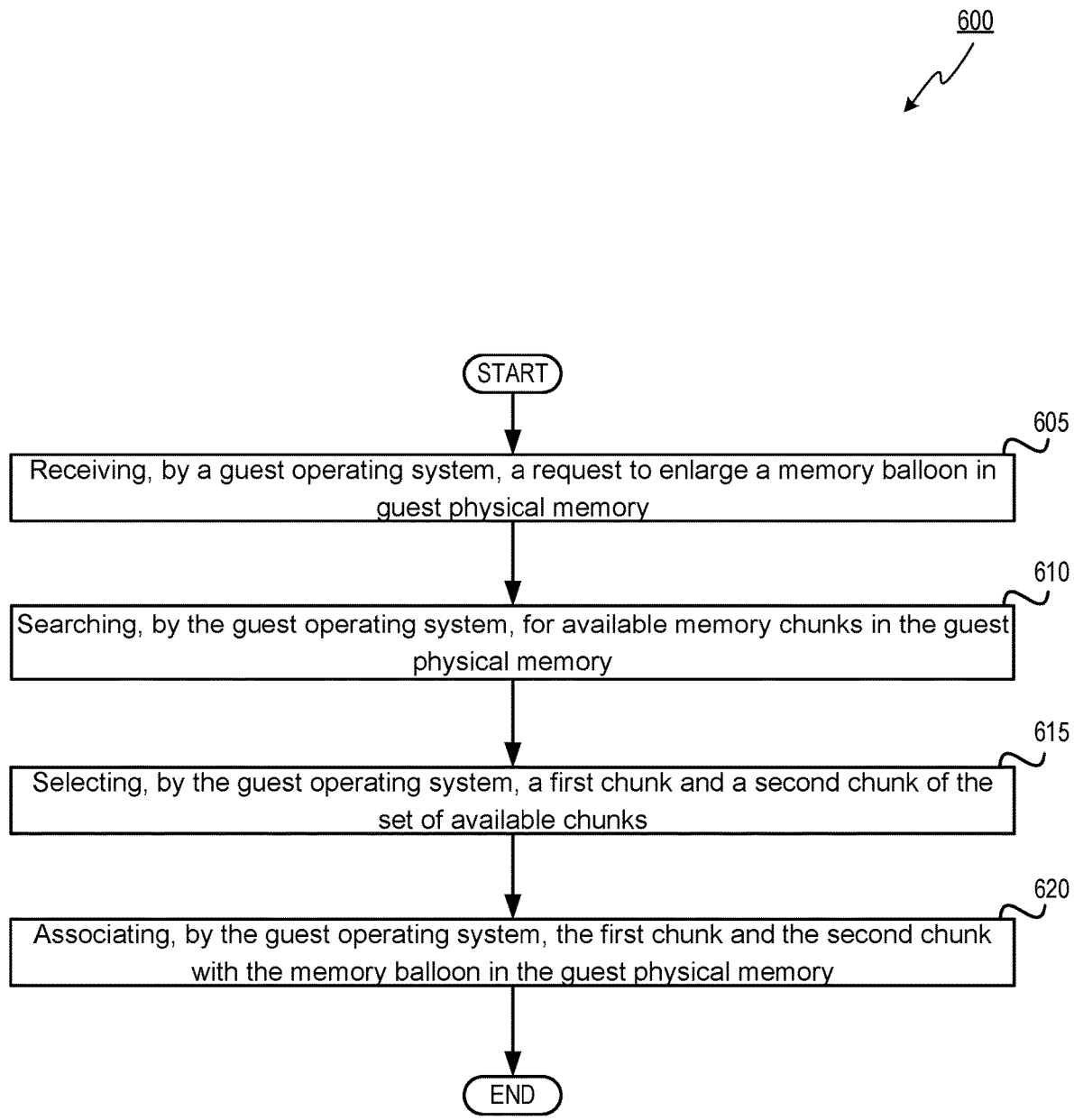
FIG. 6 depicts a flow diagram of another example method for non fragmenting memory ballooning, in accordance with one or more aspects of the present disclosure.

FIG. 6 depicts a flow diagram of one illustrative example of a method 600 for non fragmenting memory ballooning, in accordance with one or more aspects of the present disclosure. Method 600 may be similar to method 400 and may be performed in the same or a similar manner as described above in regards to method 400. Method 600 may be performed by processing devices of a server device or a client device and may begin at block 605.

At block 605, a guest operating system may receive a request to enlarge a memory balloon in a guest physical memory. In one example, receiving the request may involve the guest operating system receiving the request from a hypervisor. The guest operating system may include a balloon driver that manages the memory balloon. The request may indicate a size of memory to add to the memory balloon. The size may be satisfied by adding one or more chunks of available memory to the memory balloon.

At block 610, the guest operating system may search for available memory chunks in the guest physical memory. The guest physical memory may be fragmented and include a set of available chunks that are separate from each other. The available chunks may be gaps or fragments of available memory within a memory that is mostly unavailable (e.g., allocated and in use). The search for available memory chunks may involve searching for a smallest chunk of available memory before searching for a larger chunk. In one example, the set of available chunks may include chunks of available guest physical memory that are backed by host physical memory.

Searching for available memory chunks may involve analyzing a data structure that represents the set of available chunks. The guest operating system may access the data structure and the data structure may include a first and second set (e.g., chunk sets). The first set may include available chunks that are smaller than available chunks of the second set and the search may involve searching the first set before the second set. In one example, the first set may be a list that identifies the available chunks that all have a first size (e.g., 4 KB) and the second set may be a list that identifies the available chunks that all have a second size (e.g., 2 MB).

At block 615, the guest operating system may select a first chunk and a second chunk of the set of available chunks. The first chunk may be smaller than the second chunk and may be selected before the second chunk. The first and second chunks as well as the other chunks in the set of available chunks may each be a contiguous portion of available memory that is surrounded by memory that is in unavailable and in use. The selecting may identify chunks that when allocated will reduce the amount the memory is fragmented. In one example, the searching and the selecting are performed by a kernel of a guest operating system (e.g., enhanced version of a kernel memory allocator). In another example, the searching and the selecting are performed by a balloon driver of the guest operating system (e.g., balloon driver makes calls to a traditional kernel memory allocator).

At block 620, the guest operating system may associate the first chunk and the second chunk with the memory balloon. In one example, the guest operating system may also associate a chunk that is adjacent to the first or second chunks. The guest operating system may associate the chunks with the memory balloon by merging the first chunk and the adjacent chunk to produce a coalesced chunk. The coalesced chunk may be associated with the memory balloon and a chunk of the memory balloon that has a size equal to the size of the adjacent chunk may be disassociated from the memory balloon. Responsive to completing the operations described herein above with references to block 620, the method may terminate.

Figure 7:
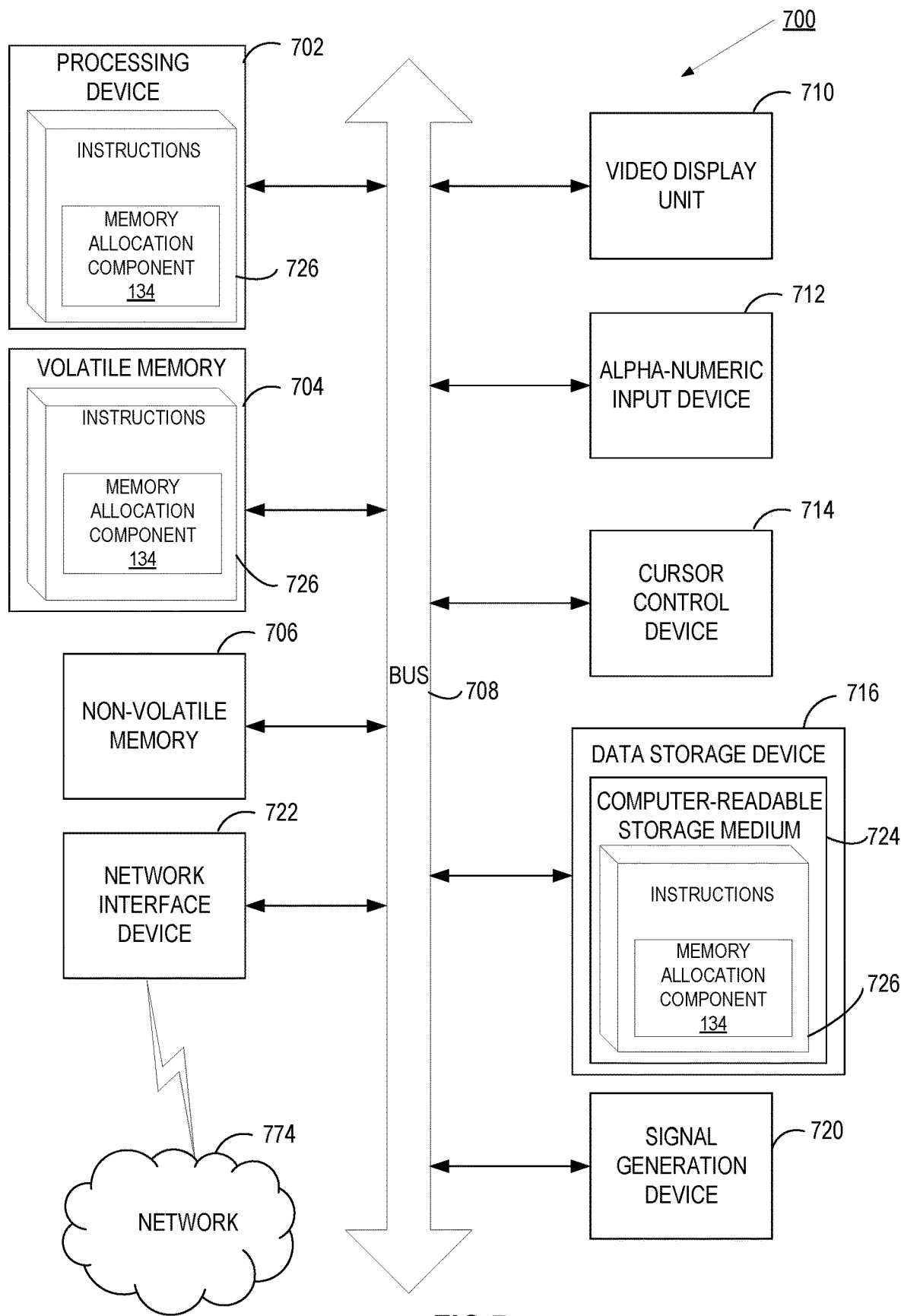
FIG. 7 depicts a block diagram of an illustrative computing device operating in accordance with the examples of the present disclosure.

FIG. 7 depicts a block diagram of a computer system operating in accordance with one or more aspects of the present disclosure. In various illustrative examples, computer system 700 may correspond to computer system 100 of FIG. 1. The computer system may be included within a data center that supports virtualization. Virtualization within a data center results in a physical system being virtualized using virtual machines to consolidate the data center infrastructure and increase operational efficiencies. A virtual machine (VM) may be a program-based emulation of computer hardware. For example, the VM may operate based on computer architecture and functions of computer hardware resources associated with hard disks or other such memory. The VM may emulate a physical computing environment, but requests for a hard disk or memory may be managed by a virtualization layer of a computing device to translate these requests to the underlying physical computing hardware resources. This type of virtualization results in multiple VMs sharing physical resources.

In certain implementations, computer system 700 may be connected (e.g., via a network, such as a Local Area Network (LAN), an intranet, an extranet, or the Internet) to other computer systems. Computer system 700 may operate in the capacity of a server or a client computer in a client-server environment, or as a peer computer in a peer-to-peer or distributed network environment. Computer system 700 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 700 may include a processing device 702, a volatile memory 704 (e.g., random access memory (RAM)), a non-volatile memory 706 (e.g., read-only memory (ROM) or electrically-erasable programmable ROM (EEPROM)), and a data storage device 716, which may communicate with each other via a bus 708.

Processing device 702 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 700 may further include a network interface device 722. Computer system 700 also may include a video display unit 710 (e.g., an LCD), an alpha-numeric input device 712 (e.g., a keyboard), a cursor control device 714 (e.g., a mouse), and a signal generation device 720.

Data storage device 716 may include a non-transitory computer-readable storage medium 724 on which may store instructions 726 encoding any one or more of the methods or functions described herein, including instructions for implementing methods 300 or 500 and for encoding batched page hinting component 134 and modules illustrated in FIGS. 1 and 2.

Instructions 726 may also reside, completely or partially, within volatile memory 704 and/or within processing device 702 during execution thereof by computer system 700, hence, volatile memory 704 and processing device 702 may also constitute machine-readable storage media.

While computer-readable storage medium 724 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "initiating," "transmitting," "receiving," "analyzing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 400 or 600 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   receiving, by a processing device, a request associated with a memory balloon;
   searching for available memory chunks in a memory, wherein the memory is fragmented and comprises a set of available chunks that are separate from each other, wherein the set of available memory chunks is represented by a data structure comprising a plurality of sets, and wherein the plurality of sets comprises a first set comprising a list identifying available chunks that comprise a first size and a second set comprising a list identifying available chunks that comprise a second size, wherein the first size is smaller than the second size;
   selecting, by the processing device, a first chunk and a second chunk of the set of available chunks, wherein the first chunk is smaller than the second chunk and is selected before the second chunk;
   associating the first chunk and the second chunk with the memory balloon;
   associating an adjacent chunk with the memory balloon, wherein the first chunk and the adjacent chunk are merged to produce a coalesced chunk, wherein the coalesced chunk is associated with the memory balloon; and
   providing information of the memory balloon to a hypervisor, wherein the hypervisor uses the information to manage a host physical memory.

2. The method of claim 1, wherein receiving the request associated with the memory balloon comprises a guest operating system receiving a request to enlarge the memory balloon from the hypervisor, wherein the guest operating system comprises a balloon driver that manages the memory balloon.

3. The method of claim 1, wherein searching for available memory chunks in the memory comprises searching for a smallest chunk of available memory before searching for a larger chunk of available memory.

4. The method of claim 1, wherein the selecting comprises allocating chunks of available memory that reduce an amount the memory is fragmented.

5. The method of claim 1, wherein each chunk in the set of available chunks is a contiguous chunk of available memory that is surrounded by memory that is unavailable and in use.

6. The method of claim 1, wherein searching for available memory chunks comprises:
   accessing a data structure that represents the set of available chunks and comprises a first set and a second set, wherein the first set comprises available chunks that are smaller than available chunks of the second set; and
   searching the first set before the second set, wherein the first set comprises the first chunk and the second set comprises the second chunk.

7. The method of claim 1, wherein the set of available chunks comprises chunks of available guest physical memory that are backed by the host physical memory.

8. The method of claim 1, further comprising: providing an indication to the hypervisor that memory of the first and second chunks are available for use without paging content of the first and second chunks to secondary storage.

9. The method of claim 1, further comprising:
   registering, by a balloon driver, for notifications corresponding to unavailable memory that is adjacent to memory associated with the memory balloon; and
   receiving, by the balloon driver, a notification indicating an adjacent chunk that is adjacent to the first chunk of the memory balloon has become available, wherein the adjacent chunk replaces a chunk of the memory balloon and a size of the memory balloon remains constant.

10. The method of claim 9, wherein associating the adjacent chunk comprises:
    disassociating a chunk that has a size equal to a size of the adjacent chunk from the memory balloon.

11. The method of claim 1, wherein the searching and the selecting are performed by either a kernel of a guest operating system or by a balloon driver of the guest operating system.

12. A system comprising:
    a physical memory; and
    a processing device communicably coupled to the physical memory, the processing device to:
    receive a request associated with a memory balloon;
    search for available memory chunks in a memory, wherein the memory is fragmented and comprises a set of available chunks that are separate from each other, wherein the set of available memory chunks is represented by a data structure comprising a plurality of sets, and wherein the plurality of sets comprises a first set comprising a list identifying available chunks that comprise a first size and a second set comprising a list identifying available chunks that comprise a second size, wherein the first size is smaller than the second size;
    select a first chunk and a second chunk of the set of available chunks, wherein the first chunk is smaller than the second chunk and is selected before the second chunk;
    associate the first chunk and the second chunk with the memory balloon;

associate an adjacent chunk with the memory balloon, wherein the first chunk and the adjacent chunk are merged to produce a coalesced chunk, wherein the coalesced chunk is associated with the memory balloon; and provide information associated with the memory balloon to a hypervisor for managing the physical memory.

13. The system of claim 12, wherein to search, the processing device is to search for a smallest chunk of available memory before searching for a larger chunk of available memory.

14. The system of claim 12, wherein to select, the processing device is to allocate chunks of available memory that reduce an amount the memory is fragmented.

15. A non-transitory machine-readable storage medium storing instructions which, when executed, cause a processing device to perform operations comprising:

receiving, by a guest operating system, a request to enlarge a memory balloon in a guest physical memory;

searching, by the guest operating system, for available memory chunks in the guest physical memory, wherein the guest physical memory is fragmented and comprises a set of available chunks that are separate from each other, wherein the set of available memory chunks is represented by a data structure comprising a plurality of sets, and wherein the plurality of sets comprises a first set comprising a list identifying available chunks that comprise a first size and a second set comprising a list identifying available chunks that comprise a second size, wherein the first size is smaller than the second size;

selecting, by the guest operating system, a first chunk and a second chunk of the set of available chunks, wherein the first chunk is smaller than the second chunk and is selected before the second chunk;

associating, by the guest operating system, the first chunk and the second chunk with the memory balloon in the guest physical memory;

associating an adjacent chunk with the memory balloon, wherein the first chunk and the adjacent chunk are merged to produce a coalesced chunk, wherein the coalesced chunk is associated with the memory balloon; and providing information of the memory balloon to a hypervisor, wherein the hypervisor uses the information to manage a host physical memory.

16. The non-transitory machine-readable storage medium of claim 15, wherein receiving the request comprises receiving the request from the hypervisor, and wherein the guest operating system comprises a balloon driver that manages the memory balloon.

17. The non-transitory machine-readable storage medium of claim 15, wherein searching comprises searching for a smallest chunk of available memory before searching for a larger chunk of available memory.

18. The non-transitory machine-readable storage medium of claim 15, wherein selecting comprising allocating chunks of available memory that reduce an amount the guest physical memory is fragmented.

19. The non-transitory machine-readable storage medium of claim 15, wherein each chunk in the set of available chunks is a contiguous chunk of available memory that is surrounded by memory that is unavailable and in use.

* * * * *